United States Patent
Zhao et al.

(10) Patent No.: US 10,987,681 B2
(45) Date of Patent: *Apr. 27, 2021

(54) LOW-FLOW MINIATURE FLUIDIC SPRAY NOZZLE ASSEMBLY AND METHOD

(71) Applicant: DLHBOWLES, INC., Canton, OH (US)

(72) Inventors: Chunling Zhao, Ellicott City, MD (US); Shridhar Gopalan, Westminster, MD (US); Zachary Kline, Burtonsville, MD (US)

(73) Assignee: DLHBOWLES, INC., Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/759,242

(22) PCT Filed: Nov. 16, 2017

(86) PCT No.: PCT/US2017/062044
§ 371 (c)(1),
(2) Date: Mar. 12, 2018

(87) PCT Pub. No.: WO2018/094068
PCT Pub. Date: May 24, 2018

(65) Prior Publication Data
US 2019/0388909 A1     Dec. 26, 2019

Related U.S. Application Data

(60) Provisional application No. 62/423,016, filed on Nov. 16, 2016.

(51) Int. Cl.
*B05B 1/08* (2006.01)
*B05B 1/04* (2006.01)
(Continued)

(52) U.S. Cl.
CPC .............. *B05B 1/08* (2013.01); *B05B 1/04* (2013.01); *B08B 3/02* (2013.01); *B60S 1/52* (2013.01); *B60S 1/56* (2013.01)

(58) Field of Classification Search
CPC ..... B05B 1/04; B05B 1/08; B60S 1/52; B60S 1/56; B60S 1/60; F15B 21/12; F15C 1/22; B08B 3/02
See application file for complete search history.

(56) References Cited

U.S. PATENT DOCUMENTS

| | | | | |
|---|---|---|---|---|
| 4,151,955 A | * | 5/1979 | Stouffer | B05B 1/08 137/835 |
| 4,185,777 A | * | 1/1980 | Bauer | B05B 1/08 239/394 |

(Continued)

OTHER PUBLICATIONS

Patent Cooperation Treaty (PCT), International Search Report and Written Opinion for Application PCT/US2017/062044 filed Nov. 16, 2017, dated Jan. 17, 2018 International Searching Authority, US.

*Primary Examiner* — Darren W Gorman
(74) *Attorney, Agent, or Firm* — McDonald Hopkins LLC

(57) ABSTRACT

A miniature low-flow, fluid conserving washer nozzle has an elongated housing enclosing an interior volume aligned along an inlet axis which receives an elongated insert member with internal fluid passages defining first and second power nozzles, so that accelerating first and second fluid flows are aimed by the first and second power nozzles toward one another in an interaction region defined within the insert with an insert throat to aim spray laterally or transversely along a spray axis through an aligned sidewall aperture in the nozzle housing. The nozzle may generate a planar oscillating sweeping fan of spray, produced by fluidic oscillations at low flow rates, typically 150-300 ml/min at 25 psi. The fan of spray generated may be varied from 20° to 70° or about 15°-60°. The outer dimensions of spray head (Continued)

could be as small as 3.5 mm. The fluidic geometry is also capable of spraying high viscosity liquids up to 25 CP or up to 15 CP.

18 Claims, 9 Drawing Sheets

(51) Int. Cl.
  *B08B 3/02* (2006.01)
  *B60S 1/52* (2006.01)
  *B60S 1/56* (2006.01)

(56) References Cited

U.S. PATENT DOCUMENTS

| | | | |
|---|---|---|---|
| 5,820,034 A * | 10/1998 | Hess | B05B 1/08 239/589.1 |
| 6,074,078 A | 6/2000 | Georgeff et al. | |
| 6,976,507 B1 * | 12/2005 | Webb | F15B 21/12 137/826 |
| 7,354,008 B2 | 4/2008 | Hester et al. | |
| 2001/0019086 A1 | 9/2001 | Spinath et al. | |
| 2003/0234303 A1 | 12/2003 | Beming et al. | |
| 2004/0251315 A1 * | 12/2004 | Maruyama | B05B 1/042 239/284.1 |
| 2005/0195239 A1 | 9/2005 | Jenkins et al. | |
| 2005/0252539 A1 | 11/2005 | Maruyama | |
| 2006/0043110 A1 * | 3/2006 | Miyauchi | B05B 1/08 222/129.1 |
| 2006/0226266 A1 | 10/2006 | Russell et al. | |
| 2011/0061692 A1 * | 3/2011 | Gopalan | B05B 1/08 134/169 R |
| 2014/0291423 A1 | 10/2014 | Gopalan et al. | |
| 2016/0001330 A1 | 1/2016 | Romack et al. | |
| 2017/0326560 A1 * | 11/2017 | Kanda | B05B 1/10 |

* cited by examiner

LOW-FLOW MINIATURE FLUIDIC SPRAY NOZZLE ASSEMBLY AND METHOD

CROSS-REFERENCE TO RELATED APPLICATIONS

This application is a 35 U.S.C. 371 national stage filing of PCT Application No. PCT/US2017/062044 filed on Nov. 16, 2017 and entitled "LOW-FLOW MINIATURE FLUIDIC SPRAY NOZZLE ASSEMBLY AND METHOD", which claims priority to Provisional Patent Application No. 62/423,016 entitled "Low-Flow Miniature Fluidic Spray Nozzle Assembly and Method" filed on Nov. 16, 2016 each of which are hereby incorporated by reference in its entirety.

FIELD OF INVENTION

The present disclosure relates generally to fluid spraying nozzles and in particular to fluid spraying nozzles for an image sensor or camera lens external surface.

BACKGROUND

This application is owned by the owner of the following patent applications which relate to washer nozzles incorporated into automotive panels or the like: (a) Integrated automotive system, compact, low profile nozzle assembly, compact fluidic circuit and remote control method for cleaning wide-angle image sensor's exterior surface (PCT/US15/25489) and (b) Micro-sized Structure and Construction Method for Fluidic Oscillator Wash Nozzle (PCT/US16/57762), the entire disclosures of which are incorporated by reference Fluidic type washer nozzles are well known for high efficiency (large coverage, high speed droplets with low flow rate) performance. Fluidic spray nozzles also maintain their spray performance over a wide range of ambient temperatures (e.g., zero degrees and above) However, a major limitation for fluidic nozzle assemblies is that the nozzle assembly's package size needs to be large enough (for example, the linear distance from the fluid inlet or feed to the exit orifice or front to back thickness customarily needs to be at least 6 mm for most of fluidic circuits).

For some automotive spray applications, nozzle assembly package size is a design consideration due to limited available space. Jet spray nozzles were commonly used in such limited space applications. Because of their very narrow spray pattern, jet spray nozzles typically must be supplied with high fluid flow rates or must be operated for longer spray durations to effectively clean a glass or external lens surface, and even then typically require a mechanical wiper or the like. Jet spray nozzles have smaller package size than fluidic nozzles, but do not have effective spray patterns for many automotive cleaning applications such as cleaning a camera lens or a headlamp, where the surface must be cleaned very well, and preferably without requiring a mechanical wiper or other fluid spreading/wiping mechanism.

Applicant's commonly owned prior work includes the Cup-shaped nozzle assembly with integral filter structure (US2014291423), the Cup-shaped Fluidic Circuit, Nozzle Assembly and Method (US2014145009), and the Integrated automotive system, compact, low profile nozzle assembly, compact fluidic circuit and remote control method for cleaning wide-angle image sensor's exterior surface (PCT/US15/25489), all of which are referenced for purposes of nomenclature and incorporated herein by reference, but these nozzle assemblies don't meet all of the needs of contemporary automotive designers, especially when integrating image sensors or cameras into an automobile's external design.

In the United States, the National Highway Traffic Safety Administration (NHSTA) has mandated that by 2018 all vehicles must have a rearview camera. In addition, Original Equipment Manufacturers (OEMs) continue to add cameras to see any point of the vehicle periphery (behind, to the side, or in front) and these will need to be cleaned. For cosmetic and styling reasons vehicle OEMs desire to have functional devices in a concealed packaged where possible. Being able to provide the desired function and performance without being obvious to the eye or intruding into other design space is a requirement for many industrial designers. Automotive designers want very compact nozzle assemblies for automotive washer nozzles, but also want an even spray distribution. Automotive OEMs also want a nozzle which is very economical and versatile. For example, exterior trim assemblies often combine many functions, such as the Center High Mounted Stop Light ("CHMSL") light assemblies now required by US Department of Transportation (DOT) regulations can include nozzle assemblies. CHMSL assemblies can include other features such as external cameras, but cleaning the lenses on those cameras becomes problematic if the automotive stylist's design for exterior trim is to be preserved.

There are many examples of automotive exterior trim assemblies with awkwardly incorporated spray nozzles which may preserve the aesthetic appearance of the automotive trim but do not generate a spray which will adequately cleans a window or other surface. An early example is provided in U.S. Pat. No. 6,074,078 which has a vehicle 14 with an exterior panel or surface 12 including CHMSL trim assembly 10 having a lens 24 with a spray tip 70 configured to spray jets of washing fluid through apertures 77 from beneath nozzle hood 44 (as reproduced in Prior Art FIGS. 1A-1D). Further, FIGS. 1E and 1F illustrate nozzle assemblies that have a larger area and in particularly have an 8 mm×8 mm space requirement (surface area of 64 mm$^2$).

This nozzle configuration will reliably pour jets of washing fluid downwardly, generally onto the rear window or backlight glass of the vehicle, but little more can be said for the spray's ability to clean any particular surface.

Nozzle configurations like that shown in FIGS. 1A-1D work well enough to clean a rear window if the wiper blade is also used, but the spray from this nozzle, alone, does little to clean the window. Shear nozzles are commonly used for small package size applications, and shear nozzles perform well for a spray fan aligned with the axis of fluid supply inlet, but perform poorly for nozzles with spray fans aimed perpendicularly to the axis of fluid inlet or feed hole. Also, shear nozzles provide poor control of spray aim and can be complicated and costly to make (e.g., tooling complications) and shear nozzles perform adequately only in a narrow range of ambient temperatures (and so do not spray or clean well when fluids are cold and have high viscosity).

Thus, there is a need, for a low flow compact fluid-conserving spray head design for cleaning applications which overcomes the disadvantages of the prior art.

SUMMARY

The present disclosure describes a miniaturized low-flow, fluid conserving fluidic oscillator nozzle assembly, comprising an elongated insert member having features defining fluid passages in communication with first and second power nozzles. A nozzle housing enclosing an interior volume which receives the elongated insert member. The fluid passages may be defined by the elongated insert member and the nozzle housing wherein said fluid passages may receive pressurized fluid. Pressurized fluid may flows into the first and second power nozzles. A first fluid flow and a second fluid flow may be aimed by the first and second power nozzles into an interaction region at least partially defined by the elongated insert member. A lateral side wall aperture may be formed in the elongated insert member and be in communication with the interaction region of the elongated insert member to define a transverse throat. The transverse throat may be aligned with a transverse aperture defined through a sidewall in the nozzle housing for issuing an oscillating jet of fluid from said interaction region.

A cross sectional shape of the lateral side wall aperture of the elongated insert member may form part of a nozzle outlet orifice. The nozzle outlet orifice may be substantially rectangular and be defined in said transverse throat by sidewalls within said elongated insert member wherein said sidewalls project upwardly from a substantially planar floor surface. The lateral sidewall aperture may be formed within the elongated insert member and be aligned along a spray axis with the transverse aperture of the housing. The spray axis may be generally perpendicular to an inlet axis of the nozzle housing wherein said elongated insert member and said nozzle housing extend along said inlet axis. Pressurized fluid may be introduced to the fluid passages adjacent a distal end of the elongated insert member wherein said first and second power nozzles and interaction region may be positioned adjacent a proximal end of the elongated insert member and wherein the distal end and proximal end align along the inlet axis. The elongated insert member may include sidewall features defining filter post arrays to filter pressurized fluid passing into and though the interior volume of the housing and into the first and second power nozzles.

The elongated insert member may be received within a bottom opening of the nozzle housing and may permit fluid to flow into said interior volume of the nozzle housing around said elongated insert member. The elongated insert member may be forced upwardly within the nozzle housing to abut an internal surface of the nozzle housing proximate a top wall. The transverse throat of said elongated insert member may be defined partially by a first sidewall, a second sidewall and a cavity floor. The first sidewall and second sidewall may be opposite one another and be separated by said lateral sidewall aperture. The floor surface may be substantially planar.

The nozzle housing includes a dome-shaped tip with a diameter size of approximately 3.5 mm. The nozzle assembly issues an oscillating jet of fluid in a spray pattern that includes a uniform spray fan (that is about 20°-70° or about (15°-60°) having aim angles between about minus 3 degrees to about plus 3 degrees from said spray axis, with a low flow rate (150-300 ml/min at 25 psi), and is capable of reliably initiating oscillation and spraying liquids having a viscosity of up to 25 CP or also having a viscosity of up to 15 CP. Further, the features defining fluid passages may be defined along an outer surface of the elongated insert member and an inner surface of the nozzle housing. The elongated insert member further comprising a first lateral inlet and a second lateral inlet formed along an outer surface of said elongated insert member, wherein said first lateral inlet and said second lateral inlet are in communication with said first power nozzle and said second power nozzle of the elongated insert member.

In one embodiment provided is a method of assembling a low-flow miniature fluidic spray nozzle assembly. The method includes the steps of providing a nozzle housing enclosing an interior volume and a transverse aperture along a sidewall. An elongated insert member may be formed having a transverse throat and features that at least partially define a fluid passage in fluid communication with a first power nozzle and a second power nozzle.

The elongated insert member may be received in the interior volume of said nozzle housing wherein said fluid passage may be defined by the elongated insert member and the nozzle housing. The transverse throat of the elongated insert member may be aligned with said transverse aperture of the nozzle housing wherein said fluid passages may be in fluid communication with a first power nozzle and a second power nozzle that may be in fluid communication with an interaction region for issuing an oscillating jet of fluid from said interaction region.

In another embodiment, provided is a miniaturized low-flow, fluid conserving fluidic oscillator nozzle assembly. The fluidic oscillator nozzle assembly includes an elongated insert member having features defining fluid passages in communication with first and second power nozzles. A nozzle housing enclosing an interior volume which receives the elongated insert member. The fluid passages may be defined by the elongated insert member and the nozzle housing to receive pressurized fluid, wherein pressurized fluid flows into the first and second power nozzles, wherein a first fluid flow and a second fluid flow are aimed by the first and second power nozzles into an interaction region at least partially defined by the elongated insert member. A lateral side wall aperture may be formed within the elongated insert member and be in communication with the interaction region of the elongated insert member to define a transverse throat that is aligned along a spray axis. A transverse aperture may be defined through a sidewall in the nozzle housing for issuing an oscillating jet of fluid from said interaction region wherein said spray axis may be generally perpendicular to an inlet axis of the nozzle housing wherein pressurized fluid is introduced to the fluid passages adjacent a distal end of the elongated insert member and said first and second power nozzles and interaction region are positioned adjacent a proximal end of the elongated insert member wherein the distal end and proximal end align along the inlet axis. The features defining fluid passages include a first lateral inlet and a second lateral inlet formed along an outer surface of said elongated insert member, wherein said first lateral inlet and said second lateral inlet are in communication with said first power nozzle and said second power nozzle of the elongated insert member. The features defining fluid passages may be defined along an outer surface of the elongated insert member and an inner surface of the nozzle housing. A top portion of the nozzle housing includes a shape having a surface area less that at least one of 50 mm$^2$, 25 mm$^2$, and 10 mm$^2$. A camera or sensor surface may be positioned adjacent the nozzle assembly wherein the nozzle assembly may be positioned to issue said oscillating jet of fluid to said camera or sensor surface wherein the distance between the nozzle assembly and the camera or sensor surface is about 10-20 mm. The width of said oscillating jet of fluid may be from about 20°-70° or about 15°-60° with a flow rate of about 150-300 ml/min for a fluid supply pressure of about 25 psi.

Specific reference is made to the appended claims, drawings, and description below, all of which disclose elements of the invention, as well as any of the commonly assigned patents, patent publications, and patent application serial numbers identified herein. While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

BRIEF DESCRIPTION OF THE DRAWINGS

Operation of the present disclosure may be better understood by reference to the detailed description taken in connection with the following illustrations. These appended drawings form part of this specification, and any written information in the drawings should be treated as part of this disclosure. In the same manner, the relative positioning and relationship of the components as shown in these drawings, as well as their function, shape, dimensions, and appearance, may all further inform certain aspects of the present disclosure as if fully rewritten herein. In the drawings.

DETAILED DESCRIPTION

Figure 1A:
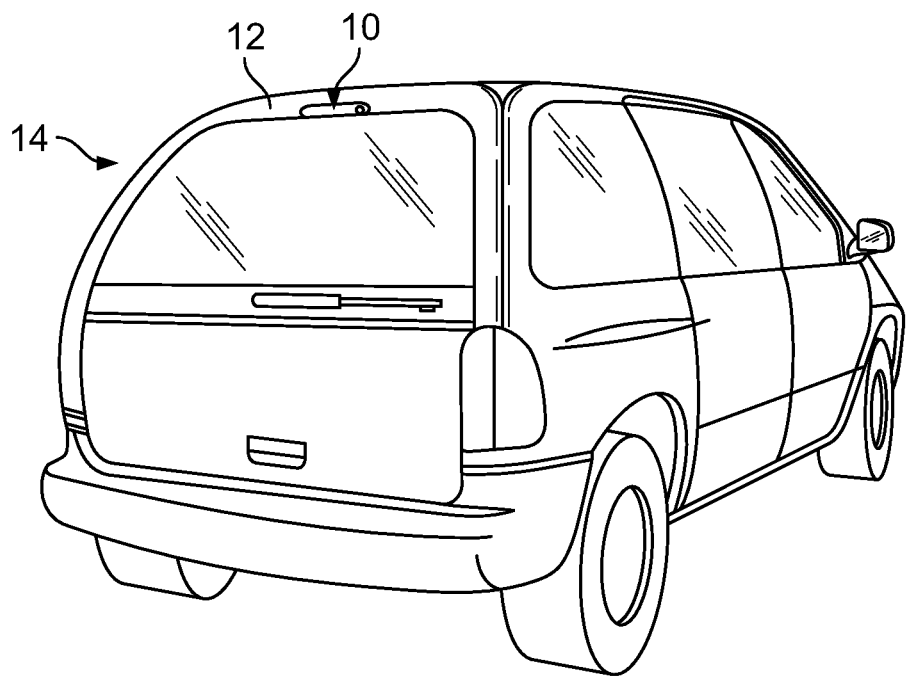
FIG. 1A is a perspective view of a prior art embodiment of a vehicle with a traditional Center High Mount Stop Light ("CHMSL") trim assembly including a nozzle configured to pour jets of cleaning fluid onto said vehicle's rear window.
Figure 1B:
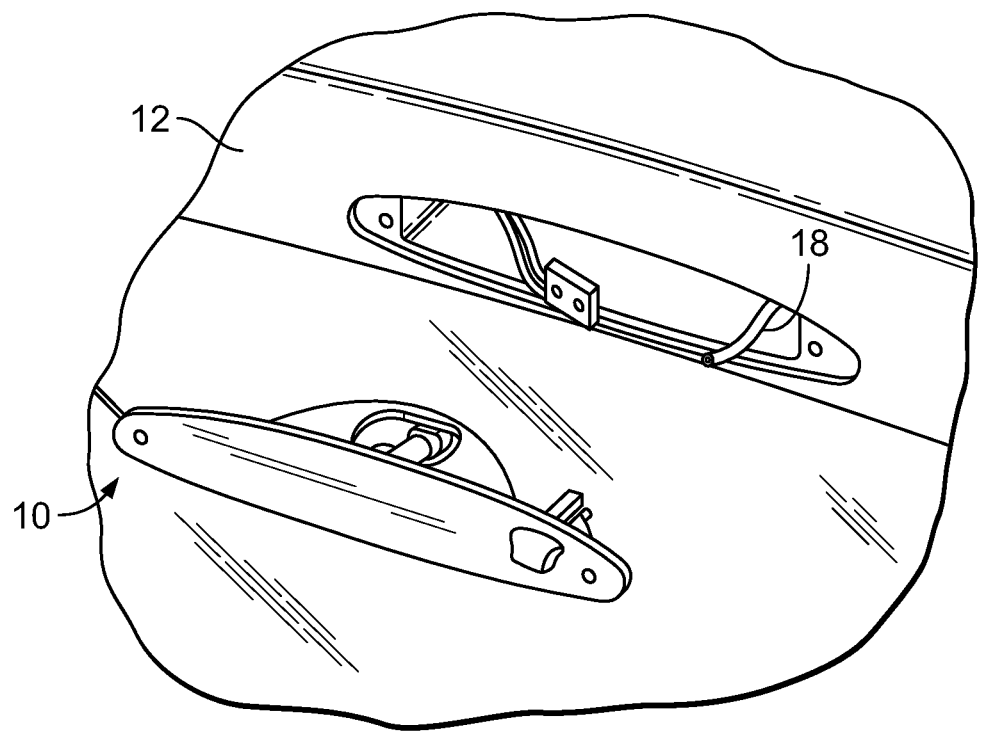
FIG. 1B illustrates a perspective cut-out view of FIG. 1B with the CHMSL trim assembly detached from the vehicle.
Figure 1C:
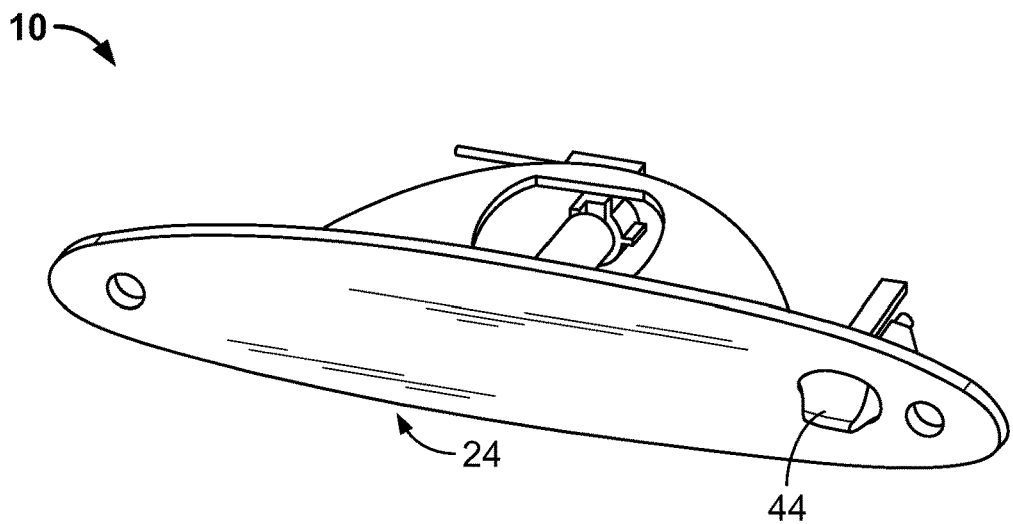
FIG. 1C is a perspective view of the prior art CHMSL trim assembly including a nozzle of FIG. 1A.
Figure 1D:
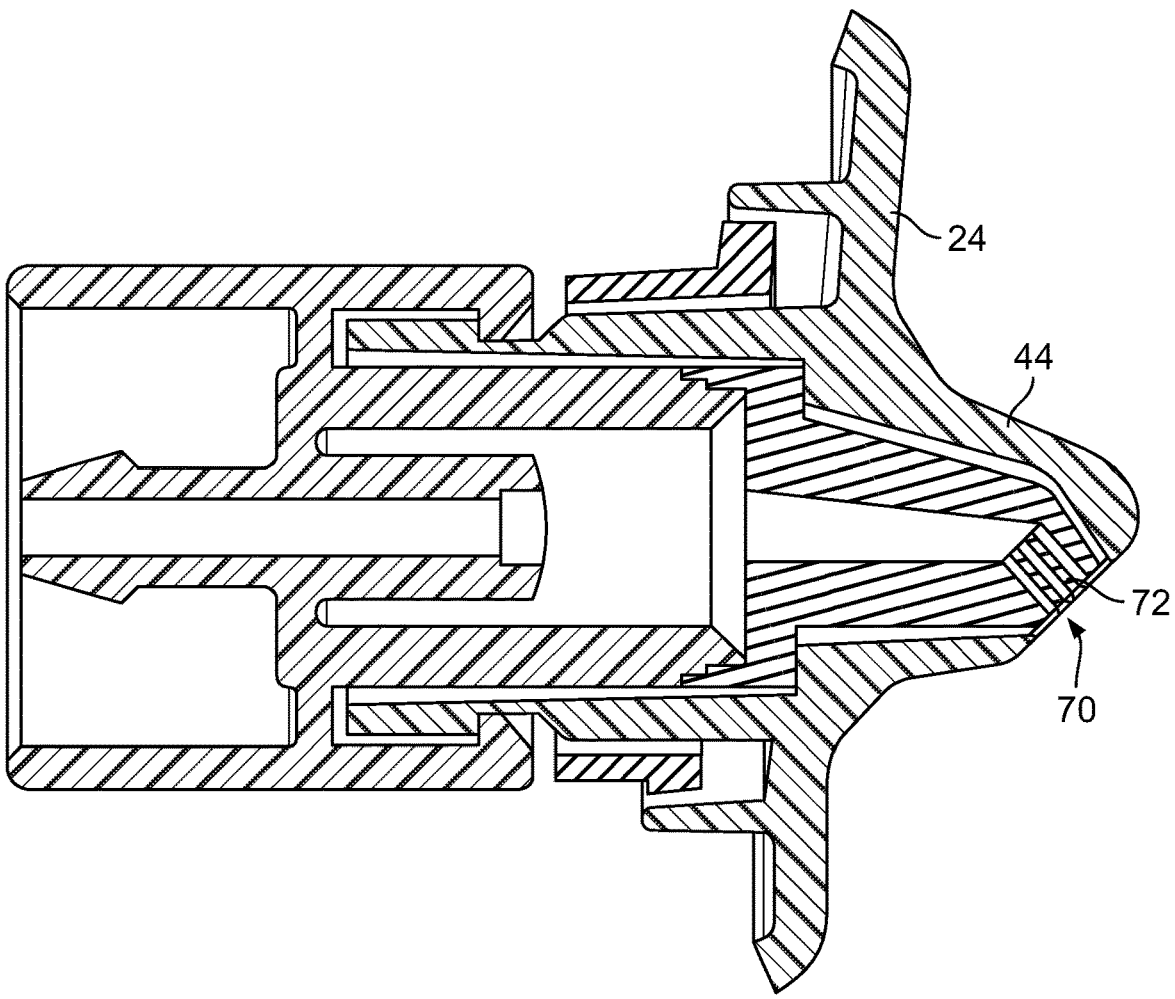
FIG. 1D is a cross sectional view of the prior art nozzle of the CHMSL trim assembly of FIG. 1C.
Figure 1E:
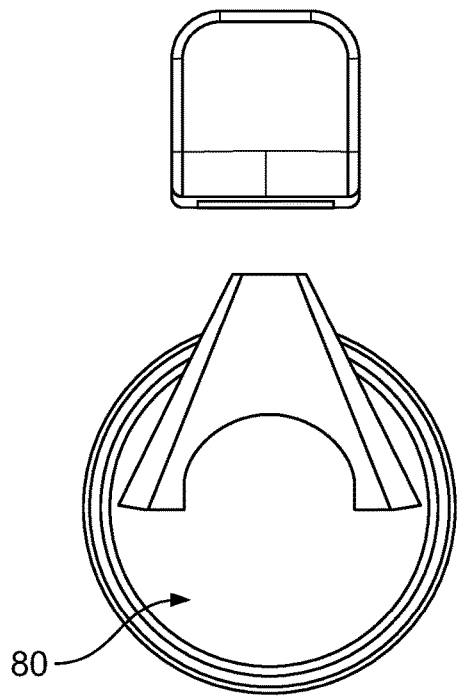
FIG. 1E illustrates a top schematic view of a prior art embodiment of a nozzle assembly for washing automotive camera lenses.
Figure 1F:
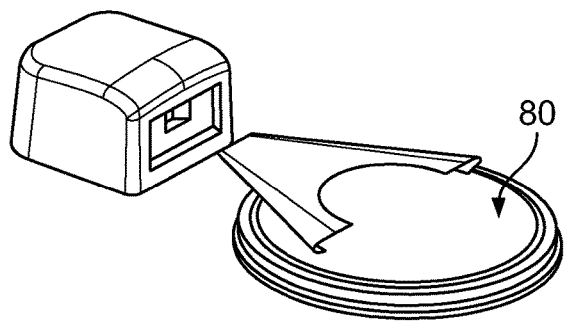
FIG. 1F illustrates a perspective schematic view of the nozzle assembly of FIG. 1E.

Reference will now be made in detail to exemplary embodiments of the present disclosure, examples of which are illustrated in the accompanying drawings. It is to be understood that other embodiments may be utilized and structural and functional changes may be made without departing from the respective scope of the present disclosure. Moreover, features of the various embodiments may be combined or altered without departing from the scope of the present disclosure. As such, the following description is presented by way of illustration only and should not limit in any way the various alternatives and modifications that may be made to the illustrated embodiments and still be within the spirit and scope of the present disclosure.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Similar reference numerals are used throughout the figures. Therefore, in certain views, only selected elements are indicated even though the features of the assembly are identical in all of the figures. In the same manner, while a particular aspect of the invention is illustrated in these figures, other aspects and arrangements are possible, as will be explained below.

Turning now to a detailed description of the nozzle assembly and compact spray nozzle member of the present invention, FIGS. 2A-10B illustrate specific, illustrative embodiments for low-flow miniature fluidic spray nozzle assembly and a method for assembling the nozzle assembly and aiming the nozzle's spray at an image sensor or camera lens external surface and the methods for aiming the nozzles to provide desired sprays. All of the illustrated embodiments provide a very small, miniaturized spray head design which reliably generates a spray fan or pattern which evenly distributes cleaning fluid (e.g., water) over a spray fan of selected angular spread (e.g., 20° to 70° or 15°-60°). All of the automotive trim mounted spray nozzle assemblies and compact shear spray nozzle members of the present invention are well suited for integration into an automotive exterior trim piece such as Center High Mounted Stop Light ("CHMSL") assembly 10 for use on a vehicle 14, as illustrated in FIG. 1A. The low-flow, fluid conserving washer nozzle members described below (e.g. 100) could also easily be incorporated very inconspicuously into an exterior panel 12 or external component (e.g., a side mirror assembly) of a vehicle along with an external view camera (not shown) to provide a very compact camera wash nozzle.

Turning now to FIGS. 2A-5B, low-flow, fluid conserving washer nozzle assembly 100 is adapted for automotive applications with tiny bump-shaped package size. When assembled, the nozzle assembly 100 may have a dome-shaped tip with a diameter size of approximately 3.5 mm and a height of about 3 mm from the surface of the exterior panel or external component of a vehicle. The nozzle assembly may be sized to take up less than 50 mm² of surface area when viewed from a top plan view (see FIG. 2A). Further, the nozzle assembly 200 may include a surface area that is less than 25 mm². In one embodiment, the nozzle assembly may have a surface area smaller than 10 mm².

The spray pattern 300 generated by the nozzle assembly 100 may be a uniform spray fan (20°-70° or 15°-60°) with low flow rate (150-300 ml/min at 25 psi), and the spray fan may have a selected thickness of about 6° to 25° or about 3°-10° (meaning the miniature nozzle 100 can produce a spray fan 300 which is 20-70 or 15-60 degrees wide along a lateral width axis and 6 to 25 or 3-10 degrees thick in the transverse vertical height axis), and can be aimed to spray at a spray aim angle (above or below a plane in the lateral width axis). In one embodiment, the spray aim angle may be about minus 3 degrees to about plus 3 degrees from a reference plane that is generally parallel to a surface in which the camera lens or sensor has been installed.

The nozzle assembly 100 includes a nozzle housing 110 wherein said housing 110 may have an elongated tubular shape. The nozzle housing 110 may enclose an interior volume which receives an elongated insert member 200 and to allow fluid flow therein. The elongated insert member 200 may include various structural features that define internal fluid passages that include a first power nozzle 210 and a second power nozzle 220. These various structural features may be molded in-situ to form a generally continuous member with various fluid pathways defined therein. These fluid passages may be defined within an external surface of the elongated insert member 200 and may extend from adjacent a proximal end (bottom portion) to a distal end (top portion) of the elongated insert member 200. The first and second power nozzles 210, 220 may receive pressurized fluid from the interior volume 112 of the housing. When in use, washing fluid (e.g., water, possibly including methyl or ethyl alcohol or some other cleaning agent) flows into an opening 120 in the bottom of the housing, upwardly into and towards an interior distal or end wall surface of the nozzle housing 200 and to opposing lateral inlets 245, 255 (FIG. 10B) in communication with the first and second power nozzles 210, 220. A first fluid flow may enter the lateral inlet 245 and the first power nozzle 210 and a second fluid flow may enter the lateral 255 inlet and the second power nozzle 220. The lateral inlets 245, 255 may be defined by the exterior surface of the elongated insert member 200 and an interior surface of the nozzle housing 110.

Figures 6A, 6B:
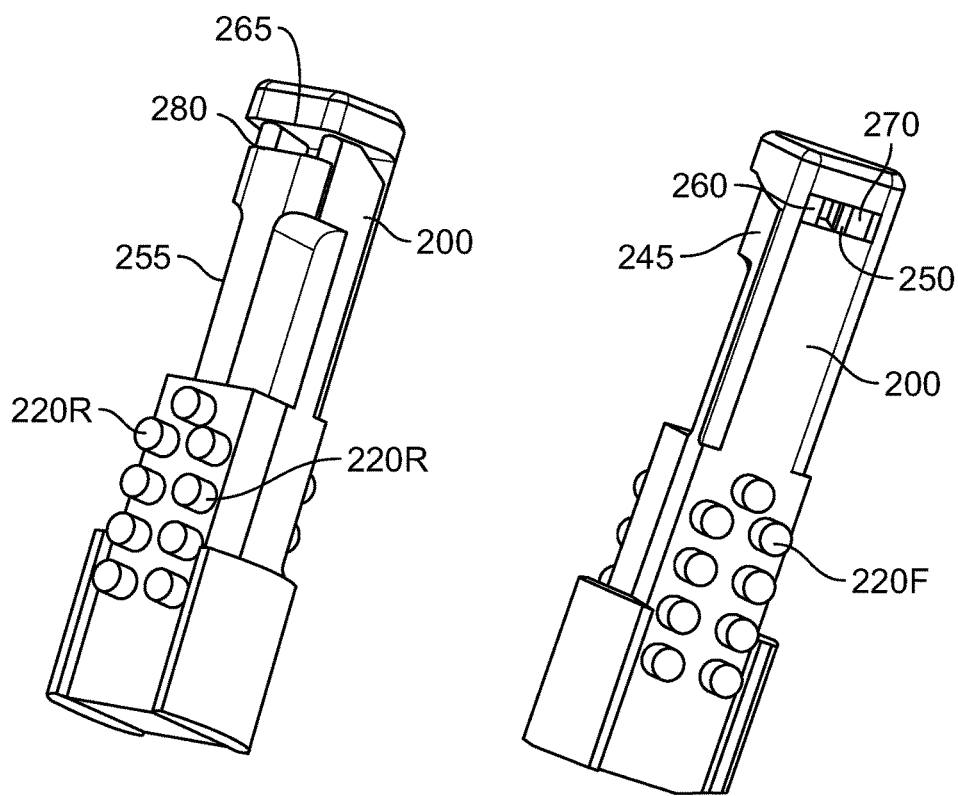
FIG. 6A is a rear perspective view of an elongated insert member of the nozzle assembly in accordance with the instant disclosure.
FIG. 6B is a front perspective view of the elongated insert member of the nozzle assembly of FIG. 6A in accordance with the instant disclosure.
Figure 7:
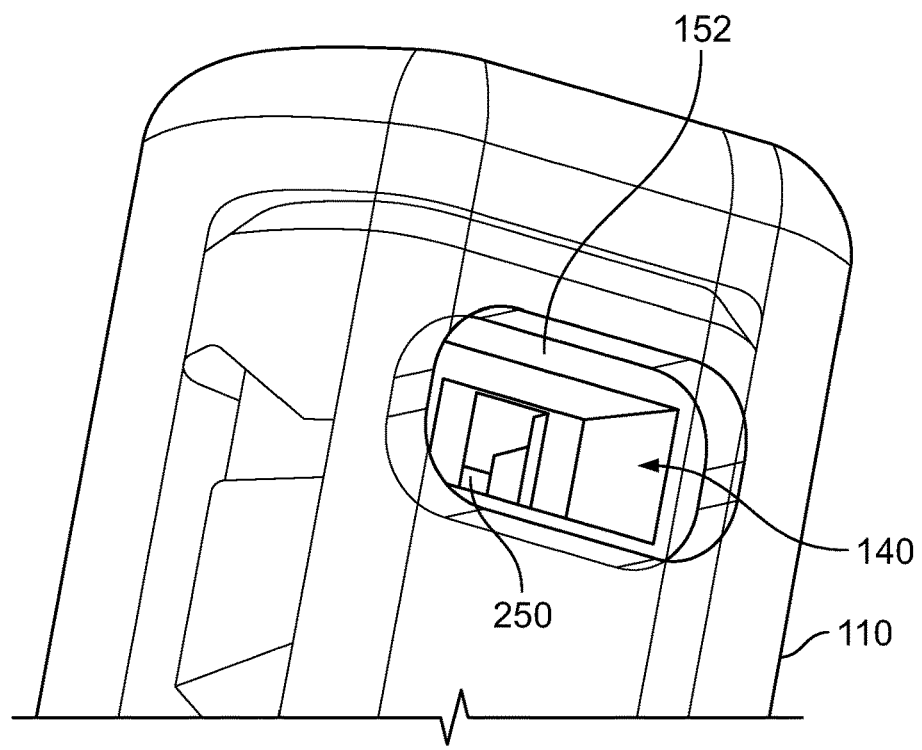
FIG. 7 is an enlarged perspective view of an embodiment of the nozzle assembly in accordance with the instant disclosure.
Figure 10A:
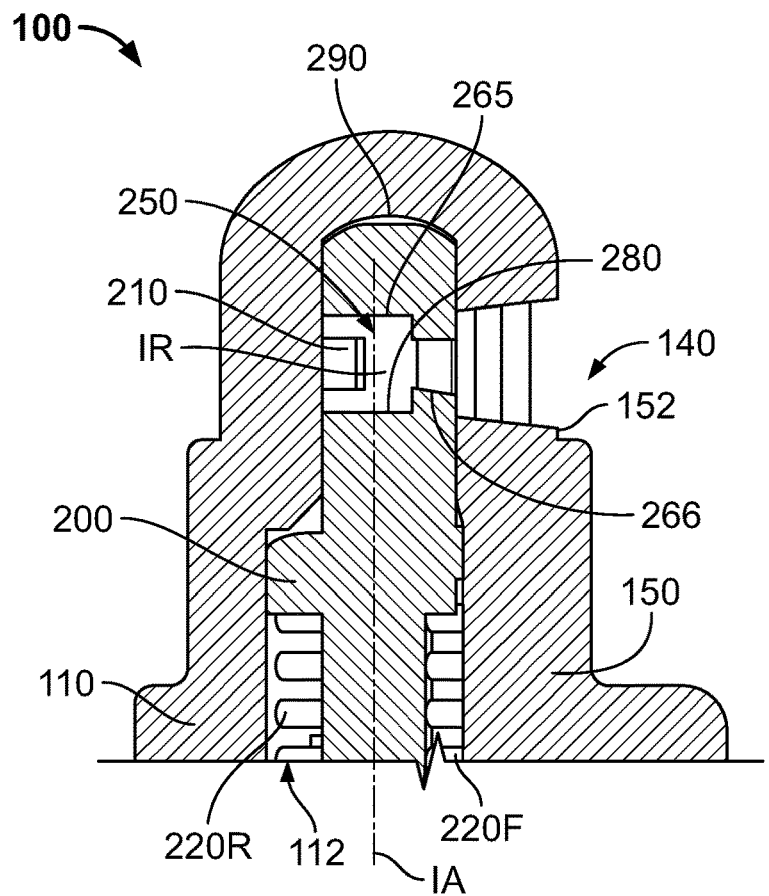
FIG. 10A is a cross sectional side view of the nozzle assembly in accordance with the instant disclosure.
Figure 10B:
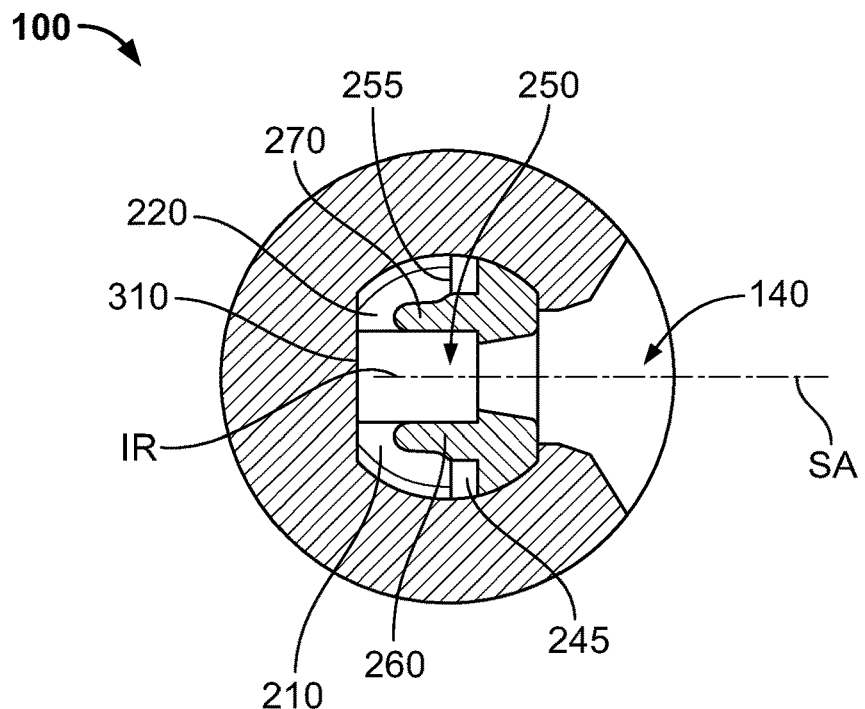
FIG. 10B is a cross sectional top view of the nozzle assembly in accordance with the instant disclosure.

Further, the power nozzles 210, 220 may also be defined in part by the exterior surface of the elongated insert member 200 and an interior surface 310 of the nozzle housing 110. (See FIG. 10B). The power nozzles act to accelerate first and second fluid flows therein and are aimed by the first and second power nozzles 210, 220 toward one another in an interaction region IR defined between the top-most or distal end wall surface 265 of the elongated insert member 200 within the housing's interior and a floor surface 280 defined by the elongated insert 200 (FIGS. 6A and 10A).

The nozzle assembly's throat or spray outlet orifice 140 may include a transverse throat 250 defined in said elongated insert member 200 which, when assembled, is aligned with an aperture 152 or lumen extending transversely through a sidewall 150 in the nozzle housing 110. The cross sectional shape of the outlet orifice 140 may be defined entirely in the elongated insert 200. The nozzle spray outlet orifice 140 may be substantially rectangular and may be defined by sidewalls 260, 270 in said transverse throat region 250 within said elongated insert member 200. Further, the first power nozzle 210 may be defined by the first sidewall 260 and the inner surface 310 of the nozzle housing 110 and the second power nozzle may be defined by the second sidewall 270 and the inner surface 310 of the nozzle housing 110.

During assembly of the nozzle 100, the insert 200 may be inserted or installed via the housing's bottom opening 120 and forced upwardly to abut internal surfaces within the housing interior's top or end wall 290. The low flow compact spray head 100 may be effective for cleaning applications with a planar oscillating sweeping jet (or sheet), produced by fluidic oscillations at the desired low flow rates, typically 150-300 ml/min at 25 psi. The oscillating spray may be reliably initiated and a uniform spray fan may be reliably generated even when spraying cold or more viscous liquids (e.g., up to 25 CP or up to 15 CP). The configuration of the described nozzle assembly may be particularly effective in cold temperatures that increase the viscosity of pressurized fluid.

In the exemplary embodiments illustrated in FIGS. 2A-10B, low-flow, fluid conserving washer nozzle 100 is provided and includes a very small profile which generates an energetic fan-shaped spray 300 aimed to exhaust or project along a spray axis SA. The spray axis SA may be generally perpendicular to an inlet axis IA of the housing's fluid inlet or feed hole. The low-flow, fluid conserving washer nozzle 100 functions reliably at a low flow rate, is easy to manufacture and can be readily configured with filter posts 220F, 220R, preferably on opposing sidewall segments of the external surface of the elongated insert member 200. However, the filter post arrays 220R, 220F may also be formed fully, or at least partially formed, along the inner surface of the nozzle housing and this application is not limited to either embodiments. Filtered washer fluid flows extend the functional life of the spray nozzle and make it significantly more reliable.

Applicants' optimized nozzle design provides a tiny compact package that allows the nozzle to be located closer to the periphery of a camera's objective lens surface 80 and possibly even more readily integrated into the camera body or surrounding vehicle trim piece. For camera and sensor wash applications, the distance between the low-flow, fluid conserving washer nozzle 100 and the camera lens surface 80 is preferably 10-20 mm, and the desired width of spray fan 300 may be from 20°-50° with a desired flowrate around 150-300 ml/min (for a fluid supply pressure of 25 psi). Being positioned closer to the camera lens(es) 80 will create performance issues with typical nozzle designs as they may not be able to distribute the available fluid flow evenly across the camera lens(es) and clean well. This is due to deficiencies in prior art nozzle designs; namely poor spray velocity profiles and narrow spray angles that the nozzle of the present invention overcomes. The purpose of this new design is to maximize the nozzle flow rate without increasing nozzle size. The fluid exit taper and size of the elongated insert member and the transverse aperture may be used for changing spray aim angle or increasing spray thickness. If both top and bottom exit surfaces have the same taper profile, the spray aim may be aligned with the spray axis at 0° but the spray thickness may increase.

The instant nozzle assembly 100 is more compact but has an optimized spray given its size. Its smaller size will satisfy Industrial Designers demands but also not impair viewing area of large viewing angle cameras. The small size and height of the nozzle assembly 100 may be outside a line of sight of various sensors and cameras. These cameras could include, but are not limited to, cameras used in parking assist or other driver assistance or self-driving features such as, but not limited to, lane departure warning, sign recognition, and auto-braking. These cameras could be located in the vehicle grill, the vehicle tailgate or liftgate, the vehicle trunk lid, side-view mirrors, or be roof-mounted. Further, these cameras may be wide view type cameras having convex lens surfaces.

The low-flow, fluid conserving washer nozzle 100 includes the insert member 200 with a transversely aimed internal cavity (i.e. throat 250) having a planar floor surface 280 positioned along a top portion of the elongated insert member 200 and being generally aligned along the spray axis SA. The floor surface 280 and the spray axis SA may be aligned along a right angle to inlet axis IA wherein said floor surface 280 and sidewalls define the fluidic oscillator's interaction region IR. In use, incoming pressurized fluid flow through the lumens defined between the sidewall segments of insert 200 and the interior sidewall surfaces of housing 110 and flows upwardly or distally to pass through the filter posts 220F, 220R and enters the power nozzles 210, 220. The power nozzles produce jets that enter the IR where vortices interact (see FIGS. 4 and 5) and generate an oscillating fan spray 300 at the outlet orifice or spray exit. The vortices are generated when one of the opposing streams or jets collides with and are deflected by the other. The opposing jets (Jet A and Jet B) cyclically change their directions when vortices A and B interact against each other. This interaction among moving vortices and moving jets generates an oscillating planar spray fan of fluid droplets which project laterally along the spray axis SA. As noted above, the first and second power nozzles are defined between or formed by the gaps between sidewalls of insert 200 and housing 110. The advantage of this design is that insert 200 is "injection-mold friendly".

Among applicants' successful prototypes (e.g., as illustrated in FIGS. 3-7) typical power nozzle widths are 0.3-0.4 mm, and typical circuit feature depths are 0.4-0.6 mm. However, various power nozzle widths and depths are considered herein and this application is not so limited. Advantageously, the design of the insert member 200 is well suited for including laterally projecting filter post members 220F, 220R. The low-flow, fluid conserving washer nozzle design as described and illustrated here is robust for manufacturing, assembling, retention, and sealing.

The illustrated embodiments may be adapted for generating different sprays. Using the nozzle configuration and method of the present invention, the features which control the shape of spray fan 300 may be changed by adjusting the ratio of throat area (throat width×throat depth) and power nozzle area (power nozzle width×power nozzle depth×2), and the spray aim angle may be changed by changing an offset step at the throat window. In the embodiment illustrated in FIG. 7, the offset step height defines a vertical wall segment having a step height of 0.025 mm to 0.075 mm). Preliminary research and testing suggest larger steps might be advantageous when certain kinds of sprays are desired.

The low-flow, fluid conserving washer nozzle assembly 100 includes a nozzle housing 110 enclosing an interior volume 112 which receives insert 200 with internal fluid passages defining first and second power nozzles 210, 220. The insert's first and second power nozzles receive pressurized fluid from the interior volume 112 of the housing, where fluid flows into an opening 120 in the bottom of the housing 110 and to opposing lateral inlets 245, 255 in communication with the first and second power nozzles 210, 220, so that accelerating first and second fluid flows are aimed by the first and second power nozzles toward one another in an interaction region IR defined within the insert's interior cavity. In this embodiment, the nozzle assembly's throat or spray outlet orifice 140 may be a transverse lumen defined through a sidewall aperture 152 in the nozzle housing, where the cross sectional shape of that throat or outlet orifice 140 is defined initially by the insert member's throat aperture 250 (best seen in FIGS. 6 and 7).

Figure 2A:
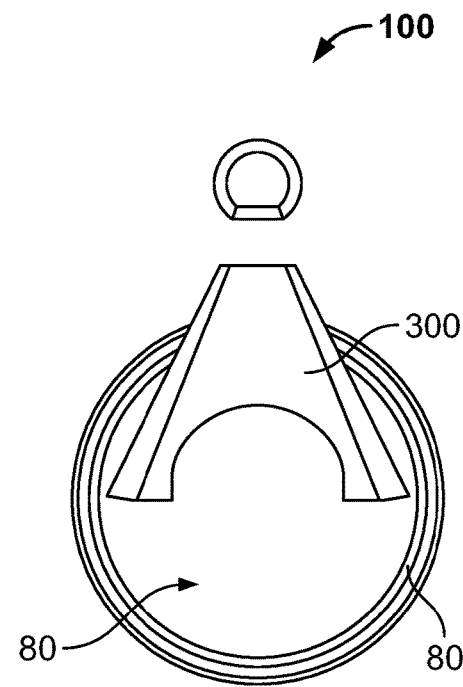
FIG. 2A illustrates a top schematic view of an embodiment of a nozzle assembly in accordance with the instant disclosure.
Figure 2B:
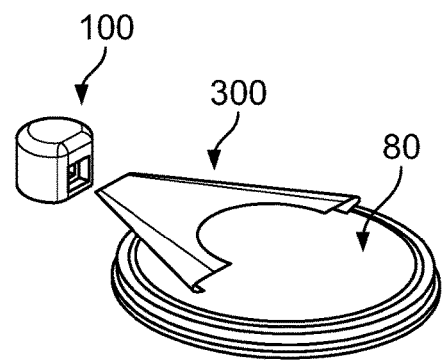
FIG. 2B illustrates a perspective schematic view of the embodiment of a nozzle assembly of FIG. 2A in accordance with the instant disclosure.
Figure 3:
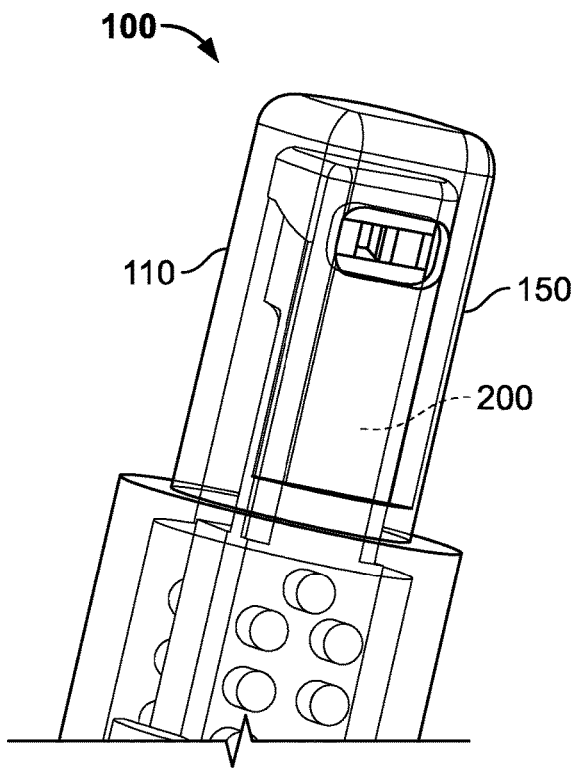
FIG. 3 is a perspective view of an embodiment of the nozzle assembly in accordance with the instant disclosure.
Figure 4:
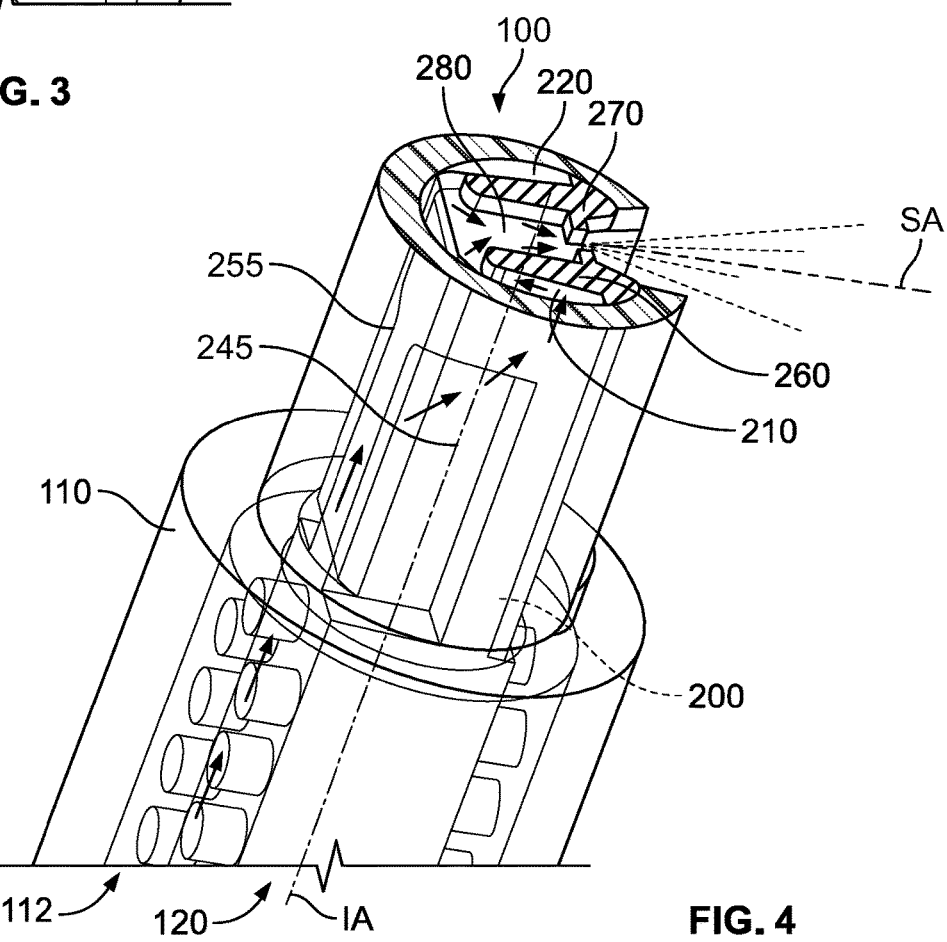
FIG. 4 is a perspective schematic view of an embodiment of the nozzle assembly in accordance with the instant disclosure.
Figure 8:
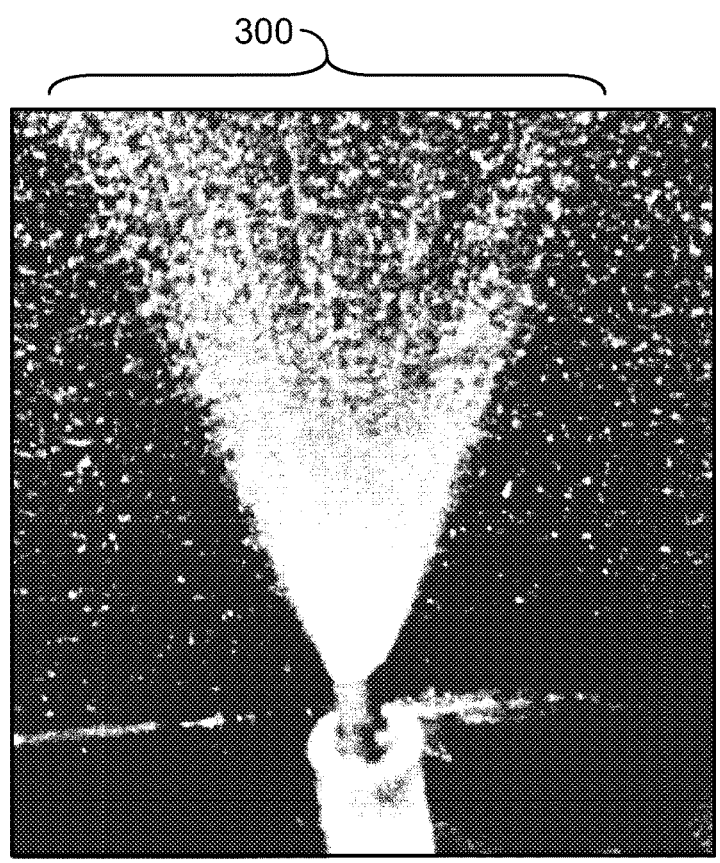
FIG. 8 is a plan view image of an embodiment of the nozzle assembly illustrating an oscillating wash or spray pattern in accordance with the instant disclosure.
Figure 9:
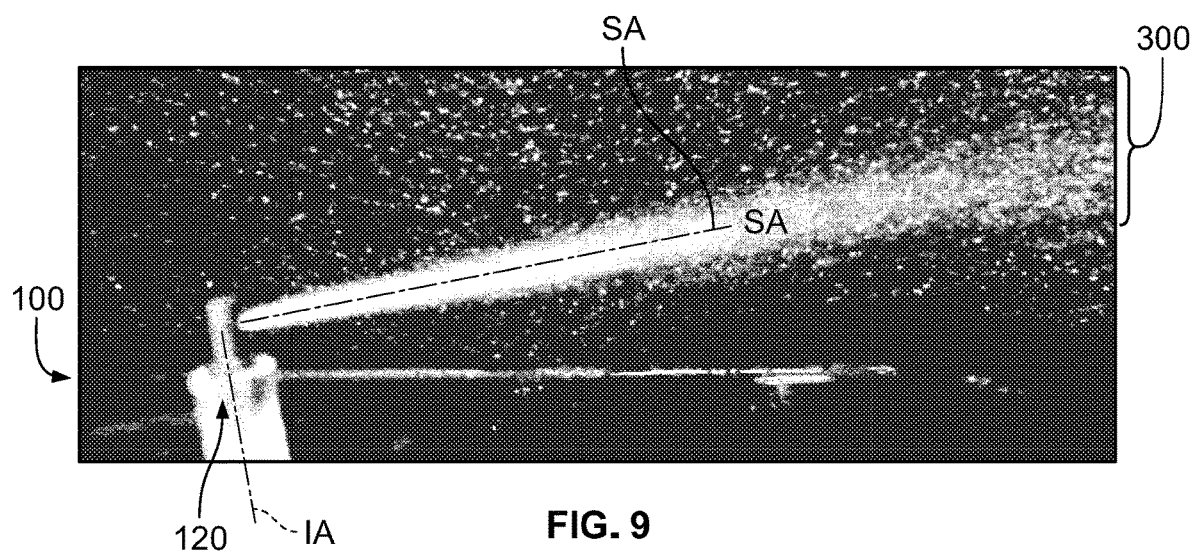
FIG. 9 is a side view image of an embodiment of the nozzle assembly illustrating an oscillating wash or spray pattern in accordance with the instant disclosure.

When in use, first and second fluid flows or jets are defined by flow through the first and second power nozzles 210, 220 and are aimed to collide within the housing's interaction region IR to generate and maintain oscillating flow vortices in the interaction region IR (as shown in FIGS. 3 and 4), those flow vortices are then forced laterally along the spray axis SA out and discharge as a flat fan spray 300 (as shown in FIGS. 2, 8, and 9) from the throat window or outlet orifice 140.

Figure 5:
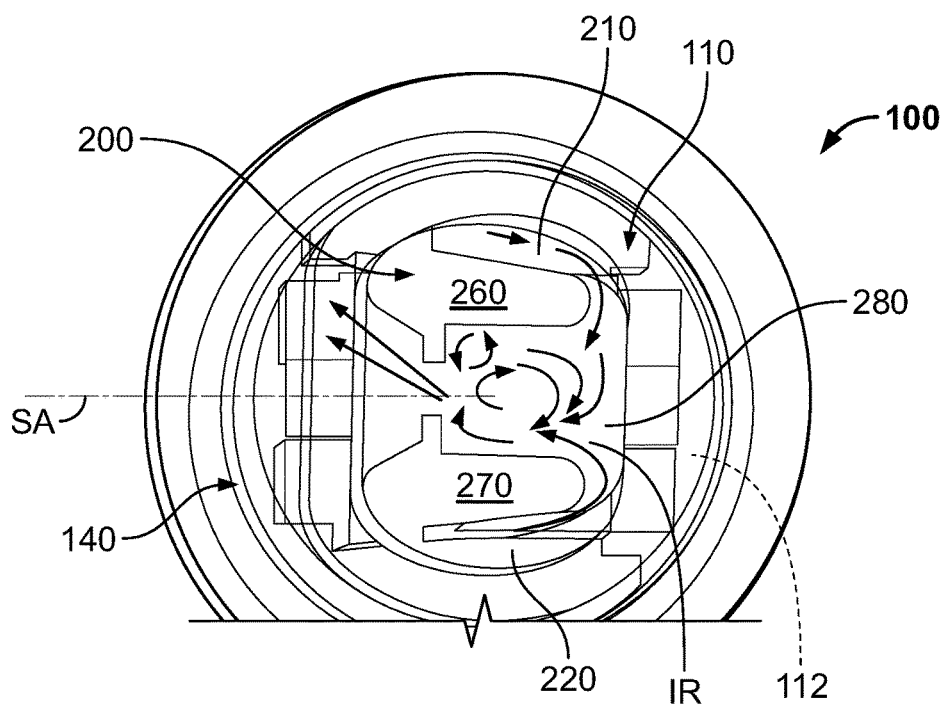
FIG. 5 is a cross sectional schematic view of an embodiment of the nozzle assembly in accordance with the instant disclosure.

In the illustrated example, the insert member's throat aperture 250 is substantially rectangular and is defined by opposing insert orifice-defining sidewalls 260, 270 which project upwardly from a substantially planar floor surface 280. The sidewalls 260, 270 and the interior surface of the nozzle housing 100 may form the first and second power nozzles 210, 220 as illustrated by FIG. 5. In order to make manufacturing and tooling nozzle assembly 100 more efficacious, the insert member's throat aperture 250 is formed within insert's distal cavity, near the outermost edges by opposing distally projecting orifice-defining column members or sidewalls 260, 270 which may be symmetrically configured around the spray axis SA and so are aligned with the aligned with the throat wall 266. The angle of wall 266 may determine the deflection angle as well as spray thickness.

Applicants' optimized nozzle design provides a compact package that allows the nozzle to be located closer to a camera's objective lens surface periphery and possibly even more readily integrated into the camera body or surrounding vehicle trim piece. Being positioned closer to the camera lens(es) will create performance issues with typical nozzle designs as they may not be able to distribute the available fluid flow evenly across the camera lens(es) and clean well due to deficiencies of prior art nozzles; namely poor spray velocity profiles and narrow spray angles that nozzle assembly 100 overcomes. Applicants' nozzle 100 is more compact but generates a surprisingly effective spray 300. Its smaller size will satisfy Industrial Designers demands but also not impair viewing area of large viewing angle cameras. These cameras could include, but are not limited to, cameras used in parking assist or other driver assistance or self-driving features such as, but not limited to, lane departure warning, sign recognition, and auto-braking. These cameras could be located in the vehicle grill, the vehicle tailgate or liftgate, the vehicle trunk lid, side-view mirrors, or be roof-mounted.

Persons of skill in the art will appreciate that the present invention provides a miniature low-flow, fluid conserving washer nozzle assembly (e.g., 100) with an elongated nozzle housing (e.g., 110) shaped as a cylindrical body enclosing an interior volume 112 aligned along an inlet axis IA which, during assembly, receives an elongated insert member (e.g., 200) with features molded onto a solid body to define fluid passages including first and second power nozzles (e.g., 210, 220), so that accelerating first and second fluid flows flowing up inside the housing's interior 112 are aimed by the first and second power nozzles toward one another in an interaction region IR defined within the insert. The interaction region exhausts or evacuates these oscillating flows transversely though an insert throat (e.g., 250) to aim spray laterally or transversely along a spray axis SA through an aligned sidewall aperture (e.g., 152) in the nozzle housing. In order minimize the nozzle assembly's thickness, during assembly of the nozzle assembly (e.g., 100), the insert 200 is preferably inserted or installed via the housing's bottom opening 120 and forced upwardly to abut and sealingly engage internal surfaces within the housing's interior (near the top or end wall). The miniature low flow spray head 100 is effective for cleaning applications with a planar oscillating sweeping fan of spray 300, produced by fluidic oscillations at low flow rates, typically 150-300 ml/min at 25 psi. The spray fan generated may be varied from 20° to 70° or 15°-60°, which is remarkable, given that (a) the outer dimensions of spray head could be as small as 3.5 mm, and (b) the fluidic geometry defined within insert member 200 is capable of spraying cold, high viscosity liquids up to 25 CP or up to 15 CP.

Figure 11:
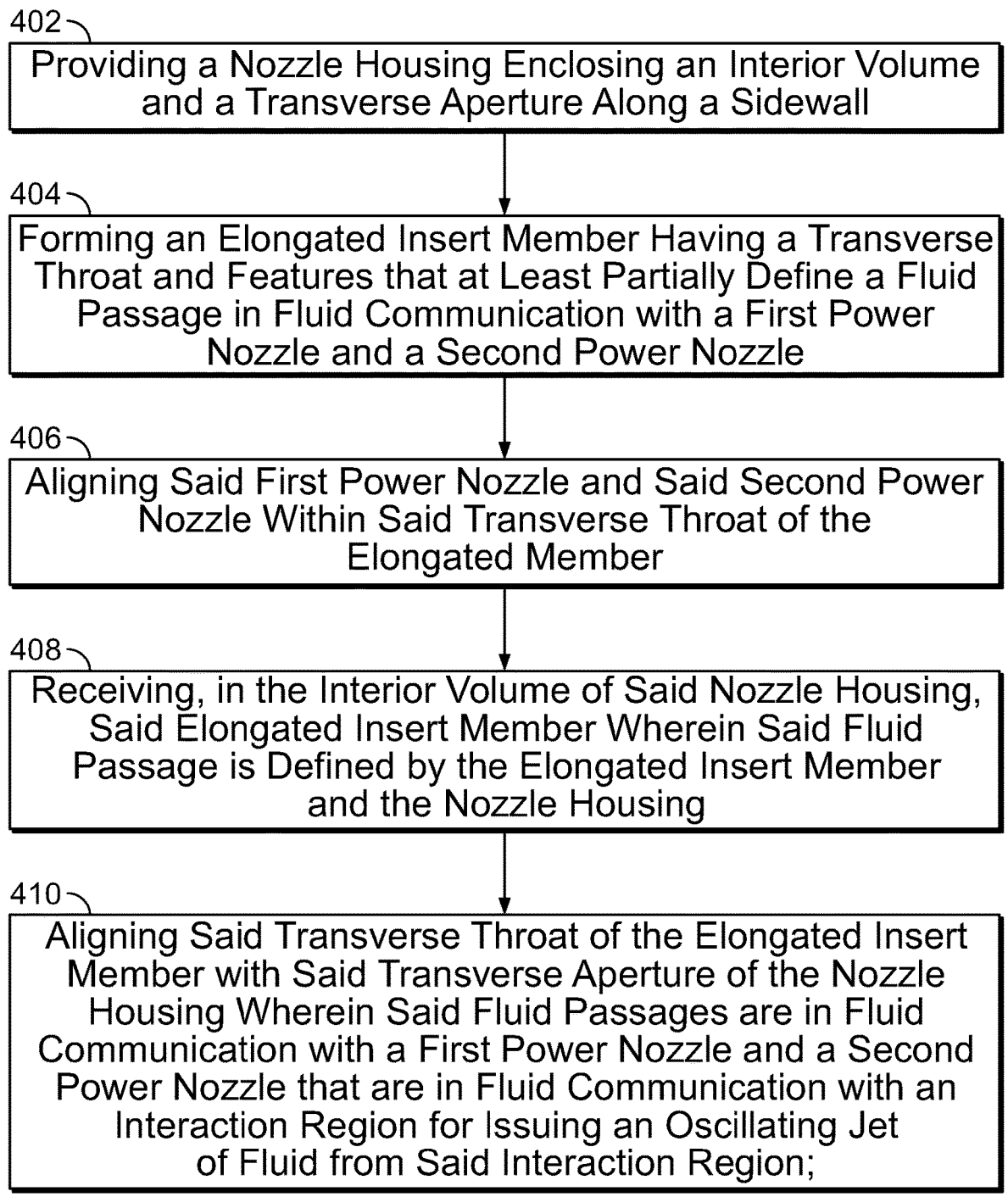
FIG. 11 illustrates a flow chart that describes a method of assembling a low-flow miniature fluidic spray nozzle assembly.

FIG. 11 illustrates a flow chart that describes a method of assembling a low-flow miniature fluidic spray nozzle assembly. The method includes the steps of providing a nozzle housing enclosing an interior volume and a transverse aperture along a sidewall in step 402. Forming an elongated insert member having a transverse throat and features that at least partially define a fluid passage in fluid communication with a first power nozzle and a second power nozzle in step 404. Receiving, in the interior volume of said nozzle housing, said elongated insert member wherein said fluid passage is defined by the elongated insert member and the nozzle housing in step 406. Aligning said first power nozzle and said second power nozzle within said transverse throat of the elongated member in step 408. Aligning said transverse throat of the elongated insert member with said transverse aperture of the nozzle housing wherein said fluid passages are in fluid communication with a first power nozzle and a second power nozzle that are in fluid communication with an interaction region for issuing an oscillating jet of fluid from said interaction region in step 410.

Although the embodiments of the present disclosure have been illustrated in the accompanying drawings and described in the foregoing detailed description, it is to be understood that the present disclosure is not to be limited to just the embodiments disclosed, but that the present disclosure described herein is capable of numerous rearrangements, modifications and substitutions without departing from the scope of the claims hereafter. The claims as follows are intended to include all modifications and alterations insofar as they come within the scope of the claims or the equivalent thereof.

Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A miniaturized low-flow, fluid conserving fluidic oscillator nozzle assembly, comprising:
    an elongated insert member having features defining fluid passages that at least partially include first and second power nozzles;
    a nozzle housing enclosing an interior volume which receives the elongated insert member;
    wherein said fluid passages are defined by the elongated insert member and the nozzle housing and said fluid passages receive pressurized fluid, wherein pressurized fluid flows into the first and second power nozzles, wherein a first fluid flow and a second fluid flow are aimed by the first and second power nozzles into an interaction region at least partially defined by the elongated insert member;
    a lateral side wall aperture formed at least partially within the elongated insert member that is in communication with the interaction region of the elongated insert member and defines a transverse throat, said transverse throat is aligned with a transverse aperture defined through a sidewall in the nozzle housing for issuing an oscillating jet of fluid from said interaction region;
    wherein the lateral sidewall aperture is aligned along a spray axis with the transverse aperture of the housing, wherein said spray axis is generally perpendicular to an inlet axis of the nozzle housing wherein said elongated insert member and said nozzle housing extend along said inlet axis; and
    wherein pressurized fluid is configured to be introduced to the fluid passages adjacent a distal end of the elongated insert member, and said first and second power nozzles and interaction region are positioned adjacent a proximal end of the elongated insert member wherein the distal end and proximal end align along the inlet axis.

2. The fluidic oscillator nozzle assembly of claim 1, wherein a cross sectional shape of the lateral side wall aperture of the elongated insert member forms part of a nozzle outlet orifice.

3. The fluidic oscillator nozzle assembly of claim 2, wherein said nozzle outlet orifice is substantially rectangular and is defined in said transverse throat by sidewalls within said elongated insert member wherein said sidewalls project upwardly from a planar floor surface.

4. The fluidic oscillator nozzle assembly of claim 1, wherein the elongated insert member includes sidewall features defining filter post arrays to filter pressurized fluid passing into and though the interior volume of the housing and into the first and second power nozzles.

5. The fluidic oscillator nozzle assembly of claim 1, wherein the elongated insert member is received within a bottom opening of the nozzle housing and permits fluid to flow into said interior volume of the nozzle housing around said elongated insert member.

6. The fluidic oscillator nozzle assembly of claim 1, wherein said elongated insert member is forced upwardly within the nozzle housing to abut an internal surface of the nozzle housing proximate an end wall.

7. The fluidic oscillator nozzle assembly of claim 1, wherein said transverse throat of said elongated insert member is defined partially by a first sidewall, a second sidewall and a floor surface.

8. The fluidic oscillator nozzle assembly of claim 7, wherein said first sidewall and second sidewall are opposite one another and are separated by said lateral sidewall aperture.

9. The fluidic oscillator nozzle assembly of claim 7, wherein said floor surface is substantially planar.

10. The fluidic oscillator nozzle assembly of claim 1, wherein the nozzle assembly issues an oscillating jet of fluid in a spray pattern that includes a uniform spray fan that is about 15°-60° having aim angles between about minus 3 degrees to about plus 3 degrees from said spray axis, with a low flow rate that is about 150-300 ml/min at 25 psi, and a spray thickness from about 3°-10° and is capable of reliably initiating oscillation and spraying liquids having a viscosity of up to about 15 CP.

11. The fluidic oscillator nozzle assembly of claim 1, wherein said features defining fluid passages are defined along an outer surface of the elongated insert member and an inner surface of the nozzle housing.

12. The fluidic oscillator nozzle assembly of claim 1, wherein said elongated insert member further comprising a first lateral inlet and a second lateral inlet formed along an outer surface of said elongated insert member, wherein said first lateral inlet and said second lateral inlet are in communication with said first power nozzle and said second power nozzle of the elongated insert member.

13. A miniaturized low-flow, fluid conserving fluidic oscillator nozzle assembly, comprising:
   an elongated insert member having features defining fluid passages that at least partially include first and second power nozzles;
   a nozzle housing enclosing an interior volume which receives the elongated insert member;
   wherein said fluid passages are defined by the elongated insert member and the nozzle housing and said fluid passages receive pressurized fluid, wherein pressurized fluid flows into the first and second power nozzles, wherein a first fluid flow and a second fluid flow are aimed by the first and second power nozzles into an interaction region at least partially defined by the elongated insert member;
   a lateral side wall aperture formed within the elongated insert member in communication with the interaction region of the elongated insert member and defining a transverse throat that is aligned along a spray axis; and
   a transverse aperture defined through a sidewall in the nozzle housing for issuing an oscillating jet of fluid from said interaction region, wherein said spray axis is generally perpendicular to an inlet axis of the nozzle housing wherein pressurized fluid is introduced to the fluid passages adjacent a distal end of the elongated insert member and said first and second power nozzles and interaction region are positioned adjacent a proximal end of the elongated insert member wherein the distal end and proximal end align along the inlet axis.

14. The fluidic oscillator nozzle assembly of claim 13, wherein said features defining fluid passages include a first lateral inlet and a second lateral inlet formed along an outer surface of said elongated insert member, wherein said first lateral inlet and said second lateral inlet are in communication with said first power nozzle and said second power nozzle of the elongated insert member.

15. The fluidic oscillator nozzle assembly of claim 13, wherein said features defining fluid passages are defined along an outer surface of the elongated insert member and an inner surface of the nozzle housing.

16. The fluidic oscillator nozzle assembly of claim 13, wherein a top portion of the nozzle housing includes a shape having a surface area less that at least one of 50 $mm^2$, 25 $mm^2$, and 10 $mm^2$.

17. The fluidic oscillator nozzle assembly of claim 13 wherein the nozzle assembly is positioned to issue said oscillating jet of fluid to a camera or sensor surface wherein the distance between the nozzle assembly and the camera or sensor surface is about 10-20 mm.

18. The fluidic oscillator nozzle assembly of claim 17, wherein the width of said oscillating jet of fluid is from 15°-60° with a flow rate of about 150-300 ml/min for a fluid supply pressure of about 25 psi.

* * * * *